Nov. 14, 1961  H. BERGERHOFF  3,008,399
FOCAL PLANE SHUTTER FOR PHOTOGRAPHIC CAMERAS
Filed May 31, 1960  2 Sheets-Sheet 1

INVENTOR:
HUGO BERGERHOFF
By
AGENT

Nov. 14, 1961    H. BERGERHOFF    3,008,399
FOCAL PLANE SHUTTER FOR PHOTOGRAPHIC CAMERAS
Filed May 31, 1960    2 Sheets-Sheet 2

INVENTOR:
HUGO BERGERHOFF
By [signature]
AGENT

United States Patent Office 3,008,399
Patented Nov. 14, 1961

3,008,399
FOCAL PLANE SHUTTER FOR PHOTOGRAPHIC CAMERAS
Hugo Bergerhoff, Wangen (Bodensee), Germany
Filed May 31, 1960, Ser. No. 33,011
Claims priority, application Germany May 29, 1959
4 Claims. (Cl. 95—53)

This invention relates to photographic equipment, and more particularly to a focal plane shutter for photographic cameras.

A focal plane shutter is a type of photographic shutter in which a slit, as wide as the photosensitive layer the exposure of which is controlled by the shutter, is passed directly in front of the layer. It gives an equal length of exposure to each part of the layer. The exposure time is controlled by varying the effective length of the slit in the direction of movement and by varying the speed of slit movement.

Focal plane shutters are preferred in miniature cameras but have found useful applications also in cameras handling negative material larger than standard 35 mm. film. The relatively complex structure of known shutters of the type described is not readily compatible with the limited space available in a miniature camera without some compromise which affects the range of exposure times, the convenience of operation or both. Conventional focal plane shutters also are relatively costly in manufacture and maintenance because of their complexity.

An important object of the present invention is the provision of a focal plane shutter for photographic cameras, which is composed of a minimum number of operating elements in order to reduce the cost of the elements and of their assembly, and to restrict the space occupied by the shutter. This will permit reducing the overall dimensions of the camera or to enclose additional attachments such as range finder, exposure meter or automatic exposure controls within the camera housing without increasing the dimensions thereof.

Another object of the invention is the elimination of a special and separate mechanism for actuating movement of the shutter for relatively slow speeds, such as exposure times of more than $\frac{1}{50}$ or $\frac{1}{20}$ second.

A further object is the reduction of the shortest available exposure time beyond the shortest exposure times possible with conventional focal plane shutters, and down to $\frac{1}{2000}$ second or even less.

With these and other objects in view, the invention provides two shutter blades which have respective edge portions arranged opposite each other and which define an exposure slit therebetween. The shutter blades are mounted on the camera frame or housing in such a manner that the edge portions may be moved along a predetermined path. Shutter movement is caused by an actuator member which is mounted on the frame or housing and which is movable thereon between two positions. Lost motion link means are interposed between the actuator member and the shutter blades so as sequentially to actuate movement of the two edge portions along their path.

In a more specific aspect of this invention, the lost motion link means includes two link members each of which is interposed between the actuator member and one of the shutter blades. Control means are coordinated with each link member and cause one of the blades to move jointly with the actuator member during a first portion of the movement of the latter from one to the other of its positions, and disconnect the actuator member from the blade during a subsequent second portion of the actuator member movement, whereas the other blade is disconnected from the actuator member and permitted to move (or not to move) independent therefrom during an initial portion of the actuator member movement, and is connected to the actuator member for joint movement during a terminal portion of the movement of the latter.

This arrangement permits the trailing blade of the shutter to start moving after a predetermined delay following initiation of the movement of the leading shutter blade for maximum effective slit length.

Other features and many of the attendant advantages of this invention will be readily appreciated as the same becomes better understood by reference to the following detailed description of a preferred embodiment thereof when considered in connection with the accompanying drawings in which like reference numerals designate like parts throughout the several figures thereof, and wherein.

Figure 1:
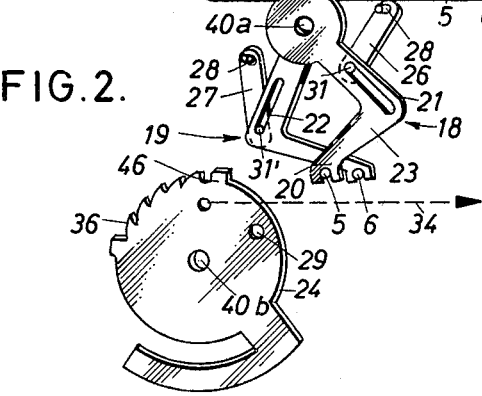
FIG. 1 is a front elevational view of a focal plane shutter of the invention, the view being taken in the direction of the light incident on the shutter in the operative condition of the camera.
Figure 1:
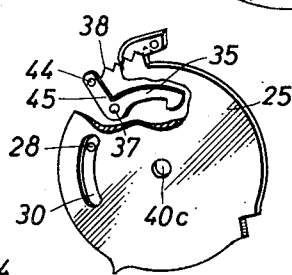
Figure 1:
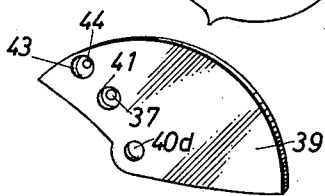
Figure 1:
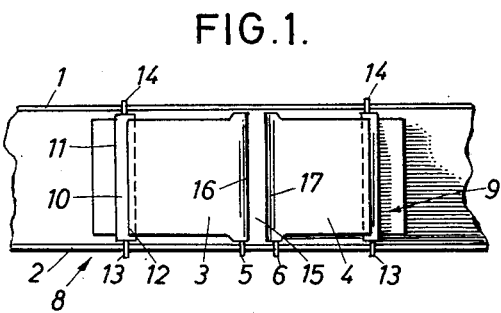

Referring to the drawing now in more detail, and initially to FIG. 1, there are shown two frame members 1 and 2 which are fixedly secured to the camera housing (not shown) in a customary manner. Two rigid shutter blades 3 and 4 are mounted between the frame members 1 and 2 by means of pivoted brackets 8 and 9. Each of the brackets consists of a slotted cylinder 10. The opposite bearing faces 11 and 12 of the slot provide sliding support for the blade. The cylinders 10 are journaled in the frame members 1 and 2 by means of axially extending pins 13 and 14. The shutter blades are thus capable of rotary movement about the axis of the corresponding cylinder 10, and of translatory movement substantially radially of the axis.

The opposite edge portions 16 and 17 of the blades 3 and 4 define the exposure slit 15 between the shutter blades. Movement is transmitted to the shutter blades by means of pins 5 and 6 which respectively extend from the edge portions 16 and 17 in a direction transverse of the direction of slit movement during exposure. The slit and the edge portions 16 and 17 move in a common plane whereas the individual blades move in their individual planes and simultaneously pivot about the axes of their respective bracket cylinders 10.

Figure 3:
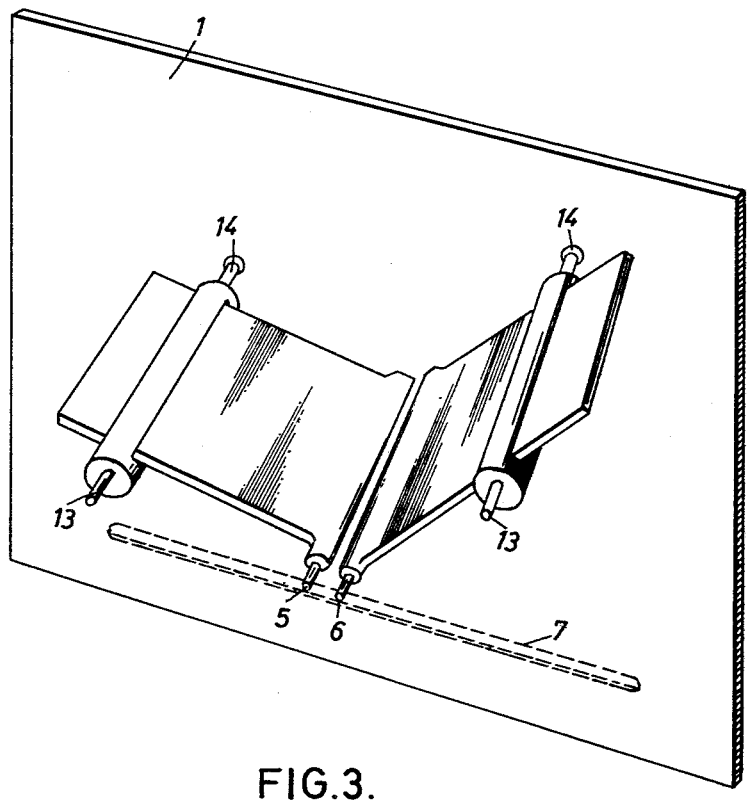
FIG. 3 is a fragmentary perspective view of the shutter of FIG. 1.

The structure supporting the blades is best seen from FIG. 3 which shows the frame member 1 while the frame member 2 is broken away and there is shown a phantom view of a rectilinear slot 7 formed in the frame member 2 in which the pins 5 and 6 are engaged to guide rectilinear movement of the edge portions of the blades.

Figure 2:
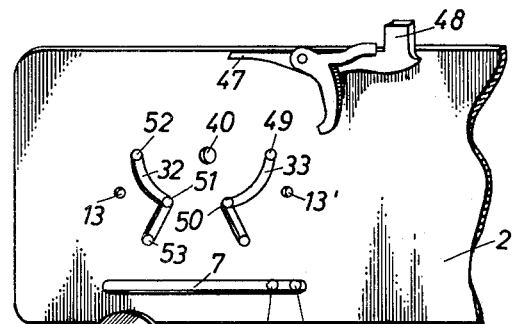
FIG. 2 is an exploded perspective view of the drive mechanism of the shutter of FIG. 1.

FIG. 2 illustrates the drive mechanism of the shutter of FIGS. 1 and 3 in an exploded perspective view taken substantially in the plane of FIG. 1. The frame member 2 is shown with its slot 7 in which the pins 5 and 6 of the shutter blades are engaged. The frame member 2 has two additional slots, the guide slots 32 and 33. The guide 32 has an arcuate portion which extends between the points 49 and 50 and is centered on a mounting hole 40. A subsequent portion of the guide slot 32 extends radially outward relative to the mounting hole 40 from the point 50. The guide slot 33 has a corresponding arcuate portion between points 51 and 52, and a radial portion between points 51 and 53. Whereas the radial portion of the guide slot 32 extends from the clockwise end of the arcuate slot portion, the radial portion of the guide slot 33 extends from the counterclockwise end of the arcuate portion of the guide slot 33 as viewed in FIG. 2.

Two openings 13' in the frame member 2 receive the pins 13 of the pivoted brackets 8 and 9 which support the blades of the shutter. A support shaft (not shown in order not to crowd FIG. 2) is mounted in the hole 40 and supports the other elements of the drive mechanism.

The shutter release button 48 is movably attached to the frame member 2 and actuates a stop member 47 the functions of which will become presently apparent.

Two angled cranks 18 and 19 each have a hole 40a which receives the support shaft on which the cranks are freely rotatable. The cranks are of substantially identical shape but are mounted on the shaft in reversed alignment. Each crank has an inner radial portion 21 having a radially elongated guide slot 22, and an outer tangential portion 23 terminating in a free forked end 20 which engages a respective one of the pins 5 and 6.

A link 26 has a pin 28 at one end, and a pin 31 at the other end. The pin 28 which extends parallel to the direction of the axis of rotation of the cranks 18, 19 transmits movement to the link 26, and the pin 31 which is oriented likewise and one end of which is engaged in the guide slot 22 of the crank 18 is capable of transmitting to the crank circumferential movement only. When moving radially of the mounting hole 40a of the crank, the pin 31 merely slides along the cam face formed by the radial interior wall of the slot 22. The pin 31 passes through the link 26 and its ends project from both faces of the latter. The end projecting from the link in a direction away from the viewer in FIG. 2, and obscured by the link, engages the guide slot 32 in the frame member 2.

A link 27 cooperates with the crank 19 and the frame member 2 in substantially the same manner. It has respective motion transmitting pins 28' and 31' of which the latter is engaged in the slot 22 of the crank 19, and in the guide slot 33 of the frame member 2.

Next to the cranks 18 and 19, the support shaft carries two discs 24 and 25 which are rotatable on the shaft, and thus angularly displaceable relative to each other. The disc 24 receives the support shaft in a mounting hole 40b and has an opening 29 of circular shape and somewhat larger in cross section than the pin 28 of the link 26 which is engaged in the opening 29 in the assembled condition of the device.

A tension member 34 connected to the spring mechanism of the shutter (not shown) urges the disc 24 to move in a clockwise direction. The disc is secured in the set position of the shutter by a lug 46 which cooperates with the stop member 47 of the shutter release button 48, and is permitted to follow the force exerted by the tension member 34 when the release button 48 is depressed so as to raise the stop member 47 out of engagement with the lug 46. The disc 24 is provided with circumferential ratchet teeth 36.

The disc 25 is threaded on the support shaft by means of its mounting hole 40c about which it is rotatable. A portion of the disc is broken away in FIG. 2 to reveal a pawl 35 which is pivoted to the disc 25 by means of an axially extending pin 37 which passes through the disc and projects from both faces thereof. The pawl is urged to move clockwise as viewed in FIG. 2 into engagement with the ratchet teeth 36 of the disc 24 by a spring 38 one end of which is attached to the disc 25 whereas the other end is secured to the arm 45 of the pawl 35 by means of a pin 44. An arcuate slot 30 in the disc 25 is centered on the mounting hole 40c and receives the pin 28' of the link 27 in the assembled condition of the device.

The outermost element on the support shaft is a segment shaped disc 39 which projects outside the camera housing (not shown) and can be moved by the photographer to set the exposure time of the shutter. The disc 39 is rotatably mounted on the support shaft by means of its mounting hole 40d. The disc 39 has two circular openings 41 and 43 which respectively receive the pins 37 and 44 in the assembled condition of the apparatus. As shown in the drawing, there is substantial clearance between the walls of the openings 41, 43 and the pins 44, 37.

The aforedescribed device operates as follows:

Angular displacement of the two discs 24 and 25 is performed when the former is arrested by engagement of the stop member 47 with the lug 46 to set the effective length of the exposure slit 15. To set the exposure time, the photographer turns the segment shaped disc 39. When the disc is rotated clockwise as viewed in FIG. 2, the internal wall of the opening 41 abuts against the pin 37 whereby the disc 25 is taken along. Because of the configuration of the ratchet teeth 36, the pawl 35 is capable of skipping over the teeth. The required pivotal movement of the pawl about the pin 37 is permitted by the clearance about the pin 44 in the opening 43.

When the disc 39 is turned counterclockwise, the small movement of the pin 44 along the walls of the opening 43 causes the pawl 35 to be disengaged from the ratchet teeth 36, and the disc 25 is capable of following the movement of the segment shaped disc 39 which is transmitted to the pin 37.

Positioning of the discs 24 and 25 relative to each other is reflected in the positions of the links 26 and 27. For the very shortest exposure time, the discs are positioned in such a manner that the pin 31 of the link 26 is located at the innermost end of the slot 22 of the crank 18, and the pin 31' at the outermost end of the slot of the crank 19. The far ends of the pins are simultaneously engaged in the guide slots of the frame member 2 at 49 and 51 respectively. The pin 28' is at the bottom end of the slot 30 as viewed in FIG. 2.

When the shutter release button 48 is depressed, the two discs 24, 25 are permitted to run down under the urging of the tension member 34. The pin 31 of the link 26 moves from 49 to 50 in an arcuate path, and the pin 31' of the link 27 from 51 to 52. Both shutter blades move practically simultaneously and the length of the slit 15 remains substantially constant throughout the shutter movement.

When the exposure time is to be longer, the discs 24 and 25 are positioned by the segment shaped disc in such a manner that the pin 31' of the link 27 is initially at the point 53 of the guide slot 33. Because of the engagement of the stop member 47 with the lug 46, the pin 31 will again initially be at point 49.

When the shutter is released, the pin 31 moves from 49 to 50 and the crank 18 is pivoted to move the pin 5, and thus the leading shutter blade 3 over its full stroke. The pin 31' simultaneously moves from 53 to 51 in a radial path, and concurrently along the length of the slot 22 in the crank 19. Because of the radial direction of this movement, it does not cause pivoting of the crank 19, and the shutter blade 4 remains at rest during the initial phase of the shutter movement. As the movement of the tension member 34 continues to rotate the discs 24, 25, the pin 31' enters the arcuate portion of the slot 33 between the points 51 and 52 so that the crank 19 is pivoted and the trailing shutter blade 4 is made to follow the leading shutter blade 3 across the face of the sensitive layer of the film. When the movements of the two shutter blades immediately succeed each other, the exposure time corresponds to the full opening of the shutter. The full frame is exposed simultaneously for a short instant.

The shutter of the invention permits exposure times which are longer than that which corresponds to the instantaneous full opening of the shutter because of the arcuately elongated configuration of the slot 30 in the disc 25. When the disc 25 is set in an angular position beyond that of the preceding example of operation of the shutter, the pin 28' is located near or at the upper end of the slot 30 as viewed in FIG. 2. The pins 31 and 31' are again in their respective positions at points 49 and 53.

When the shutter now runs down, the pin 31 moves arcuately from point 49 to point 50 during the initial stage of shutter movement, and the leading shutter blade is moved out of the closed position until the entire film frame is exposed to the light passing through the camera lens. Simultaneously the disc 25 moves clockwise as seen in FIG. 2 without transmitting movement to the pin 28′ of the link 27. Only when the lower end of the slot 30 abuts against the pin 28′, movement of the shutter spring is transmitted to the link 27. After this initial delay, entrainment of the link 27 by the disc 25 causes movement of the pin 31′ along the radially extending portion of the guide slot 33 from point 53 to point 51 whereas the pin 31 moves radially outward from point 50 in slot 32. Although the movement of the leading shutter has been completed, movement of the trailing shutter has not yet commenced.

When the pin 31′ of the link 27 passes the point 51 and enters the arcuate portion of the guide slot 52, movement of the trailing shutter blade is initiated. The disc 25, however, has already completed its stroke. No further moving force is transmitted from the shutter spring by means of the tension member 34 to the link 27. The link though is free to move under its own inertia and that of the shutter blade 4 while the pin 28′ travels over the length of the slot 30 to return to the position relative to the disc 25 which is illustrated in FIG. 2. Exposure times intermediate those described above in detail are set by intermediate positions of the segment shaped disc 39. The shutter of the invention is also equipped with a click 54 by means of which the shutter may be actuated for time (ball) exposures.

In a preferred embodiment of the invention, a photoelectric cell is mounted on a face of at least one of the shutter blades 3, 4 which is directed toward the lens of the camera, that is the face seen in FIG. 1. The output of the cell is transmitted to an exposure indicating device or to a device which sets the diaphragm opening of the lens, and such indicating and setting devices are jointly referred to in this application as "exposure meter means." The output transmitting means preferably consist of flexible contact wires, but I also contemplate providing cooperating contact elements on the blade on which the cell is mounted, and on one of the support or bearing faces 11 and 12 of the pivoted bracket in which the blade is mounted. Conductive connections may be established from the contact element on the bracket to the exposure meter means by a flexible wire attached to the bracket, or by an analogous pair of contact elements on one of the pins 13, 14 and the corresponding frame member 1, 2. At least one of the conductors leading from the cell to the exposure meter means must be insolated from the camera housing.

To prevent exposure of a negative while the shutter of the invention is returned to its initial position, an additional shutter element may be interposed temporarily in the path of light through the lens of the camera in a manner known in itself.

The focal plane shutter of the invention can be set for a range of exposure times from extremely rapid exposures at minimum slit length to relatively long exposures at which the full frame of the negative remains exposed to light for an appreciable period. It is not necessary to provide a special escapement or other breaking mechanism for relatively long exposure times, such as those of the order of more than 1/50, or more than 1/20 second. The maximum exposure time in a camera equipped with the shutter of this invention may readily reach, and even exceed that which corresponds to twice the length of the frame in the direction of slit movement. The lost motion arrangement incorporated in the several radial guide slots and in the arcuate slot 30 of disc 25 in cooperation with the engaging pins gives an extremely wide range of exposure times with a structure of great simplicity and small bulk. The shutter of the invention is very easily synchronized with flash bulb and electronic flash arrangements.

It should be understood, of course, that the foregoing disclosure relates to only a preferred embodiment of the invention and that it is intended to cover all changes and modifications of the examle of the invention herein chosen for the purpose of the disclosure which do not constitute departures from the spirit and the scope of the invention set forth in the appended claims.

I claim:

1. A focal plane shutter for a photographic camera, comprising a support; two shutter blades having respective edge portions arranged opposite each other and defining an exposure slit therebetween, said shutter blades being mounted on said support for movement of said edge portions thereof along a predetermined path; an actuator member mounted on said support and movable thereon between two positions; and lost motion link means interposed between said actuator member and said shutter blades for sequentially actuating movement of said edge portions along said path, said lost motion link means including two link members operatively interposed between said actuator member and a respective one of said shutter blades; first link control means cooperating with one of said link members for connecting said actuator member to one of said blades for joint movement during a first portion of the movement of said actuator member from one to the other of said positions thereof, and for disconnecting said actuator member from said shutter blade during a subsequent second portion of the movement of said actuator member; and second link control means cooperating with the other one of said link members for permitting relative movement of said actuator member and of the other one of said shutter blades during an initial portion of said movement of said actuator member, and for connecting said actuator member to said other shutter blade for joint movement during a terminal portion of said movement of the actuator member.

2. A focal plane shutter as set forth in claim 1, said first and said second link control means including respective adjusting means for adjusting the relative durations of said first and said second movement portions, and of said initial and said terminal movement portions respectively.

3. A focal plane shutter for a photographic camera, comprising a support; a leading and a trailing shutter blade having opposite respective edge portions spaced from each other in a predetermined direction so as to define an exposure slit therebetween, said shutter blades being mounted on said support for respective leading and trailing movement of said edge portions thereof in said predetermined direction; an actuator member mounted on said support; two crank members pivoted to said support in respective engagement with said blades for actuating movement thereof, each of said crank members being formed with a cam face extending radially relative to the pivot of the crank member; and lost motion link means interposed between said actuator member and said crank members for first initiating said leading movement of said edge portion of said leading shutter blade, and for thereafter initiating said trailing movement of said edge portion of said trailing shutter blade, said link means including two motion transmitting members in respective engagement with said cam faces, and guide means for guiding said motion transmitting members along respective paths having sequential radial and circumferential portions relative to said pivots.

4. A focal plane shutter for a photographic camera, comprising a support; a leading and a trailing shutter blade having opposite respective edge portions spaced from each other in a predetermined direction so as to define and exposure slit therebetween, said shutter blades being mounted on said support for respective leading and trailing movement of said edge portions thereof in said predetermined direction; an actuator member mounted on said support; two crank members pivoted to said support in respective engagement with said blades for actuating movement thereof; and lost motion link means interposed between said actuator member and said crank members for first initiating said leading movement of said edge portion of said leading shutter blade, and for thereafter initiating said trailing movement of said edge portion of said trailing shutter blade, said link means including a first and a second rotary member journaled on said support for rotation about a common axis, said crank members being pivoted to said support for movement about said axis, and said actuator member being secured to one of said rotary members for actuating rotary movement thereof; means for selectively connecting said rotary members for joint movement in a plurality of predetermined angular relationships; two elongated link members each having an end portion secured to one of said rotary members for pivoting movement about an axis parallel to said common axis; a motion transmitting member on the other end portion of each of said links, each of said crank members being formed with a cam face extending radially of said common axis, and said motion transmitting members respectively engaging said cam faces; and guide means for guiding said motion transmitting members along respective paths having sequential portions respectively radial and circumferential relative to said common axis.

References Cited in the file of this patent

UNITED STATES PATENTS

| | | |
|---|---|---|
| 2,408,549 | Brueske | Oct. 1, 1946 |
| 2,671,390 | Smith | Mar. 9, 1954 |
| 2,909,978 | Fischer | Oct. 27, 1959 |